US011829427B1

(12) United States Patent
Parampottil et al.

(10) Patent No.: US 11,829,427 B1
(45) Date of Patent: Nov. 28, 2023

(54) SYSTEMS AND METHODS FOR PROCESSING AND CERTIFYING DIGITAL MAIL

(71) Applicant: Securus Technologies, Inc., Carrollton, TX (US)

(72) Inventors: Isaac Parampottil, Coppell, TX (US); Christopher Douglas, McKinney, TX (US); Christopher Barrett Bruton, Frisco, TX (US)

(73) Assignee: Securus Technologies, LLC, Carrollton, TX (US)

( * ) Notice: Subject to any disclaimer, the term of this patent is extended or adjusted under 35 U.S.C. 154(b) by 461 days.

(21) Appl. No.: 16/825,900

(22) Filed: Mar. 20, 2020

(51) Int. Cl.
*G06F 16/953* (2019.01)
*G06F 3/12* (2006.01)
*G06F 16/955* (2019.01)
*H04N 1/23* (2006.01)
*G06K 19/06* (2006.01)

(52) U.S. Cl.
CPC .......... *G06F 16/953* (2019.01); *G06F 3/1222* (2013.01); *G06F 3/1238* (2013.01); *G06F 16/9554* (2019.01); *G06K 19/06037* (2013.01); *H04N 1/233* (2013.01)

(58) Field of Classification Search
None
See application file for complete search history.

(56) References Cited

U.S. PATENT DOCUMENTS

| 2011/0202580 A1* | 8/2011 | Kato | G11B 27/34 |
| | | | 707/822 |
| 2012/0325902 A1* | 12/2012 | Goyal | G06K 19/08 |
| | | | 235/494 |
| 2020/0162252 A1* | 5/2020 | Davis | G06F 21/105 |

FOREIGN PATENT DOCUMENTS

WO  WO-2007115219 A2 * 10/2007 ............. G06Q 10/08

* cited by examiner

*Primary Examiner* — Thomas D Lee
(74) *Attorney, Agent, or Firm* — Fogarty LLP

(57) ABSTRACT

Embodiments are directed to a database configured to store digital versions of physical or electronic items received at a controlled-environment facility. Each of the digital versions associated with a unique identifier. A digital network portal is configured to provide remote access to the database. A production system is configured to create physical or electronic copies of selected ones of the stored digital versions. The physical or electronic copy comprises an image of the original physical or electronic item and a two-dimensional barcode. The two-dimensional barcode comprises a network address for the digital network portal and the unique identifier. The two-dimensional barcode may comprise a Quick Response (QR) code.

20 Claims, 5 Drawing Sheets

SYSTEMS AND METHODS FOR PROCESSING AND CERTIFYING DIGITAL MAIL

BACKGROUND

Prison inmates or residents of controlled-environment facilities are typically allowed to send and receive mail through the postal service and/or commercial mail carriers. Generally, all incoming and outgoing inmate mail is subject to being opened and manually inspected by prison staff. The items that may be received by an inmate via mail vary depending upon the facility, but generally include written correspondence, legal or official documents, postcards or greeting cards, pictures, pamphlets, books, money, such as funds for the inmate's trust account, or the like. To prevent inmates from receiving illegal substances, however, some facilities do not deliver certain types of inbound mail, such as items with gummed or adhesive labels or with non-postal stamps. The list of mail items that are not permitted can be fairly extensive. For example, certain facilities do not allow inmates to receive maps, transportation schedules, stickers, decals, cosmetics, hair care, hygiene items, food, gifts, locks of hair, items sprayed with perfume, ribbons, cigarettes, matches, lighters, dried or pressed flowers, coupons, lottery tickets, compact discs, cassette tapes, bookmarks, postage stamps, stationery, writing or drawing materials, paper clips, gang-related materials, sexually explicit materials, etc. Mail containing such items may be destroyed or disposed of instead of being delivered to the inmate.

Rather than eliminating all access to such prohibited mail items, facilities may scan and digitize mail items and provide an electronic copy to the inmates. This may be achieved using a digital mailbox service that provides electronic or digital versions of physical mail items to inmates. The digital version of mail items may be stored and made available to the inmates as well as investigators, law enforcement officers, facility staff, inmates' attorneys, and the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a system comprises a database configured to store digital versions of physical or electronic items received at a controlled-environment facility. Each of the digital versions associated with a unique identifier. A digital network portal is configured to provide remote access to the database. A production system is configured to create physical or electronic copies of selected ones of the stored digital versions. The physical or electronic copy comprises an image of the physical or electronic item and a two-dimensional barcode. The two-dimensional barcode comprises a network address for the digital network portal and the unique identifier. The two-dimensional barcode may comprise a Quick Response (QR) code.

The production system may comprise a printer configured to print hard copies of the selected ones of the stored digital versions and/or a digital output module configured to save copies of the selected ones of the stored digital versions to digital media. The digital network portal may be a server hosting a website that is configured to be accessed from a public data network, such as the Internet.

In another embodiment, a method comprises creating a digital version of a physical or electronic item received at a controlled-environment facility, assigning a unique identifier to the digital version of the physical or electronic item, and creating a physical or electronic copy of the digital version of the original physical or electronic item, wherein the physical or electronic copy comprises an image of the original physical or electronic item and a two-dimensional barcode, and wherein the two-dimensional barcode comprises a network address for a digital network portal and a unique identifier. The two-dimensional barcode may comprise a QR code. The method further comprises providing the physical or electronic copy to a requesting party, receiving, at the digital network portal, a query from the requesting party to access the digital version of the physical or electronic item, wherein the query comprises the unique identifier, and providing the digital version of the physical or electronic item for display to the requesting party. The requesting party may or may not be a resident of the controlled-environment facility.

The physical item may comprise a document, letter, or photograph, and the digital version of the physical item may then be created by scanning the physical item. The physical item may comprise a memory device, and the digital version of the physical item may comprise copying content stored on the memory device. The physical item may comprise a three-dimensional object, and the digital version of the physical item may include creating a digital representation of the three-dimensional object.

The controlled-environment facility may be a prison or jail, and the physical or electronic item was sent to an inmate, arrestee, or detainee who is a resident of the facility.

In an example use case, the invention allows a law enforcement official with proper permissions to use their smartphone to select the QR code within a scanned digital mail image and to thereby confirm the authenticity of the image through a separate, secure URL in the event that the image is used as evidence.

Figure 1:
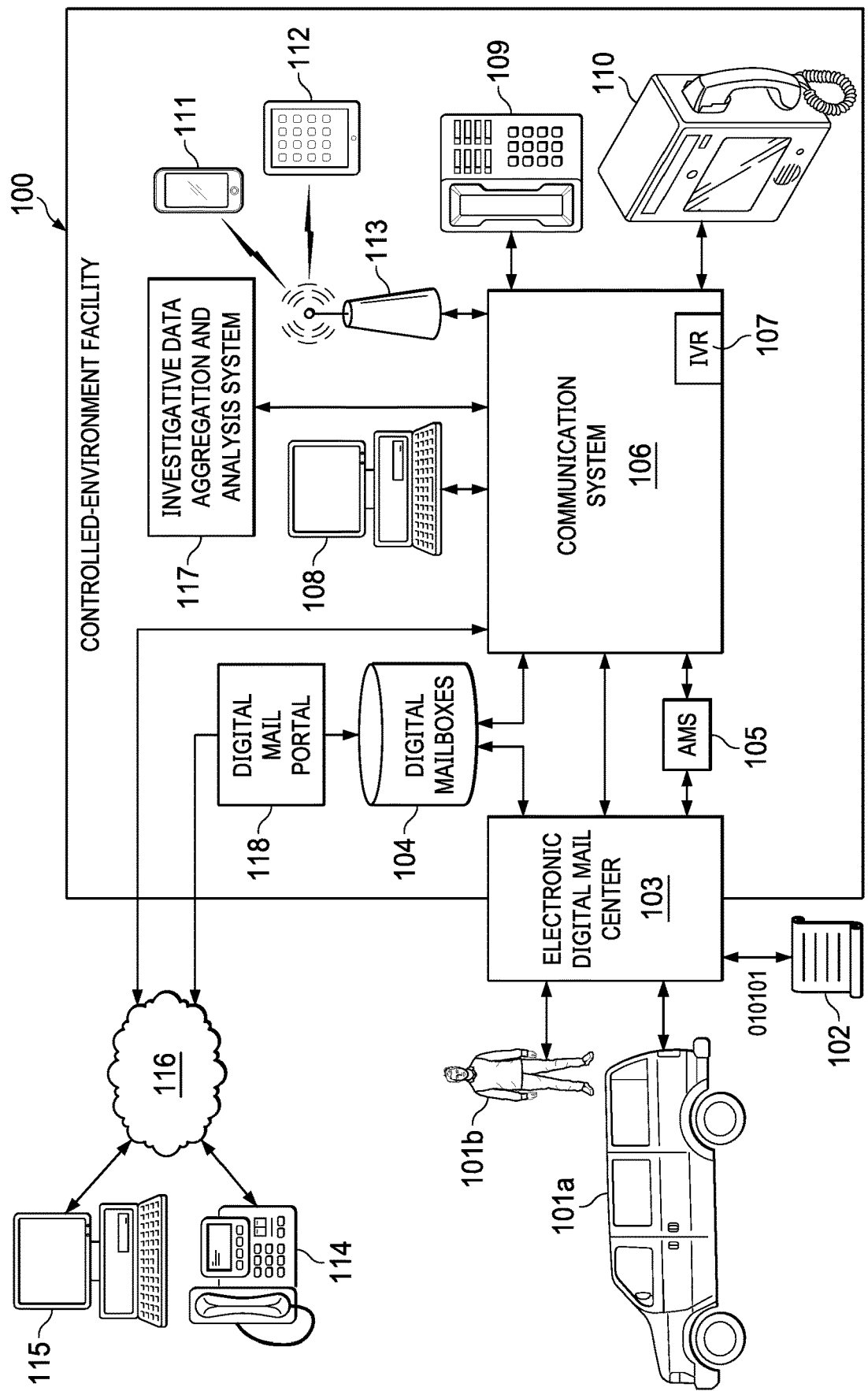
FIG. 1 is a block diagram of an example environment where a digital mail service may be employed according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to providing access to digital mail or electronic copies of correspondence associated with residents of such facilities. As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents. Moreover, the systems and methods described herein may be used to support communications in other facilities that have fewer or no access restrictions.

FIG. 1 is a block diagram of an example environment where a digital mail service may be employed according to some embodiments. Physical items may be delivered by U.S. Postal Service 101a, by courier (e.g., UPS, Federal Express, etc.), or in-person 101b to an electronic digital mail center 103 of controlled-environment facility 100. In other embodiments, electronic digital mail center 103 may also receive inbound electronic documents 102, such as electronic messages (email), chats, texts, or a document (e.g. PDF, JPEG, DOCX, XLSX) attached to an email. Electronic digital mail center 103 is coupled to digital mailbox database 104, administration and management system (AMS) 105, and communication system 106, which may include or be coupled to interactive voice response (IVR) system 107. Communication system 106 may be coupled to a variety of communication devices, such as, for example, computer 108, telephone 109, or a communal communication and media terminal 110. Any appropriate network, such as a plain old telephone service (POTS) network, voice over IP (VoIP) network, two-wire telephone network, or digital network, such as the Internet, an intranet, or an enterprise network, may be used to connect communication devices 108-110 to communication system 106. A wireless access point 113 may also be used to connect communication system 106 to wireless devices, such as smartphone/personal media device 111 or tablet computing device 112. Wireless access point 113 may provide an RF interface (e.g., based on Wi-Fi, Bluetooth, ZigBee, WiMAX, Near-field communication (NFC), or other communication protocols or standards) and may exchange data wirelessly between communication system 106 and wireless devices 111 and 112.

Communal communication and media terminal 110 may be referred to as an Intelligent Facility Device (IFD) and may be a video phone particularly adapted for use in a controlled-environment facility. IFD 110 may also be used to place voice calls and may take the form of, or be used as, a voice phone that may have a touchscreen interface. Generally speaking, IFD 110 may be located in a visitation room, in a resident pod, as part of a kiosk, etc. Residents may also use a personal computer wireless device, such as smartphone/media player 111 or tablet computing device 112, that is adapted and/or approved for use in a controlled-environment facility. Such a smartphone/media player 111 or tablet computing device 112 may be referred to as an Intelligent Resident Device (IRD) or, in a correctional institution embodiment, as an Intelligent Inmate Device (IID). As will be appreciated, IFD 110, IRD 111, 112, or similar devices, as well as computer 108 and phone 109, etc. have communications capabilities, to enable a party to participate in telephone calls, video visitation sessions (video calls), or the like with other call parties, such as nonresidents, under control of communication system 106.

IFD 110 may be a replacement for typical telephones provided in controlled-environment facilities, such as rehabilitation centers, jails and prisons, utilizing existing facility telephony wiring. While the IFD 110 is generally illustrated in FIG. 1 as hardened, wall-mounted devices, IFD 110 may also take the form of a kiosk-type terminal or the like. In some cases, IFD 110 may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFD 110 may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends.

IRDs 111 and 112 may be adapted and/or approved for use by residents of controlled-environment facility 100. For example, IRDs 111 and 112 may be "stripped-down," particularly from the standpoint of what applications are provided or allowed on the IRD and/or the connectivity afforded to the IRD. By way of example, such an IRD may employ an operating system kernel that has been rebuilt for use in such a tablet computing device in a controlled-environment facility. As a further example, such an IRD may be adapted to only connect to a network (e.g., access point 113) provided by controlled-environment facility 100, and/or in only certain locations, within the controlled-environment facility 100, such as may be controlled by availability of Wi-Fi access. That is, for example, where access may be compartmentalized, leveraging the structure of the controlled-environment facility 100, for example limiting the availability of a Wi-Fi signal providing the stream through the placement of wireless access points 113, antenna directionality of such wireless access points, and/or the like. Also, the IRDs 111 and 112 may have certain fixed applications pre-installed on the device, and installation of further apps on the device may be forbidden (i.e. prevented by modifications to the device's operating system, or the like) and/or restricted, such as by requiring permission from a facility administrator, or the like. Applications provided on IRD 111 and 112 may support services of particular interest to residents of the controlled-environment facility, such as access to a legal research service or access to employment searching services provided to inmates nearing release. Communication services may also be provided by IRDs 111 and 112, such as messaging, electronic mail, calling, and video visitation applications. Similar applications may be provided for residents on IFD 110.

In the context of a correctional facility, residents may use devices 108-112 to access certain communication services. In some facilities, one or more of devices 108-112 may be disposed within a kiosk or other suitable location within controlled-environment facility 100. For example, a resident may initiate telephone services by lifting the receiver on telephone 109 or IFD 110 or selecting a calling application on devices 108, 110-112. The resident may then be prompted to provide a personal identification number (PIN) or other identifying information or biometric sample (e.g., thumbprint, voice print, iris scan, etc.). IVR unit 107 may generate and play prompt or other messages to residents on devices 108-112. Under the control of communication system 106, devices 108-112 may be capable of connecting to a nonresident (e.g., residents' friends, family, attorneys, etc.). For example, a nonresident may use a telephone 114 or computer 115 to access communication system 106 across a network 116, such as a publicly switched telephone network (PSTN) or packet data network, such as, the Internet. Communication system 106 may include one or more analog switches, digital routers, IP gateways, PBX systems, etc. (not shown) that provide communication capabilities for controlled-environment facility 100. It will be understood that telephone 114 may be any analog or digital telephone device or processor-based device running a telephone application and that computer 115 may be any personal computer, laptop, tablet, smartphone, or other processor-based device.

Communication system 106 may operate to ensure that a resident's telephone calls, video visitations, messaging, texting, chats, etc. are performed only with approved nonresidents whose identities, devices, email addresses, phone numbers, etc. are listed in a resident's Pre-Approved Contact (PAC) and/or Pre-Approved Number (PAN) list. Each resident's PAC or PAN list may be stored, for example, in AMS 105. In addition to PAC or PAN list(s), AMS 105 may also store resident profile data (RPD), such as balances for inmate trust and calling accounts, trial schedule, conviction data, criminal record, sentencing data, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. As described in more detail below, AMS 105 may also include incoming and outgoing mail rules applicable to each resident or for groups of residents.

Investigative data aggregation and analysis system 117 may be a platform for providing investigative tools for communications, such as telephone calls, video visitations, and messages, such as electronic mail or texts. Such investigative tools may provide monitoring, collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like.

One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as Call Detail Records (CDRs)), so that an investigator may research them through an archive and may be provided access to internal and/or external criminal databases and/or other sources of useful information.

In operation, electronic digital mail center 103 may receive one or more inbound physical or digital items addressed to a particular resident housed within facility 100 (i.e., the intended recipient of the item). Examples of physical items include, but are not limited to, written correspondence, legal or personal documents, postcards or greeting cards, pictures, pamphlets, books, money, optical discs (e.g., CDs and DVDs), cassette tapes, flash memory devices, three-dimensional objects, etc. Upon receiving a physical or electronic item, electronic digital mail center 103 may create an electronic version or digital representation of the item, which may also be referred to herein as a digital mail item. It will be understood that the mail items may also be received as electronic documents 102 that are already in digital form. Electronic digital mail center 103 may save such electronic documents 102 as digital mail items, such as by converting the electronic document 102 to a format required for storage in database 104 or by maintain the original format of the electronic document 102 for storage. Electronic digital mail center 103 and digital mailbox database 104 will then process all digital mail items in the same way whether the item was originally received in a physical or electronic format.

For example, when the physical item is a letter, document, or picture, creating the electronic or digital version may include scanning the item into an electronic document format (e.g., PDF, JPEG, GIF, etc.) to create a digital mail item. If the physical item is a CD or DVD, creating the digital version may include copying the contents of the CD or DVD in an audio format (e.g., MP3, WAV, WMA, AIFF, AAC, etc.), video format (H.261, H.263, H.264, M-JPEG, MPEG, DivX, etc.), or another suitable file format. Also, if the physical item is a three-dimensional object, creating the digital version may include taking a digital picture of the object in a still picture format (e.g., JPEG, TIFF, RAW, BMP, GIF, etc.) or another suitable file format to create the digital mail item. In some situations, two or more different electronic representations may be obtained for the same physical item (e.g., a music CD may have its content saved in an MP3 file and the album cover may be scanned into a JPG image).

After converting the inbound physical or electronic item into a digital mail item in electronic form (or converting an inbound electronic document 102 to a format required for storage), electronic digital mail center 103 may store the digital version of the inbound item within digital mailboxes database 104. In some cases, electronic digital mail center 103 may cause a physical notification to be delivered (e.g., on paper or verbally through prison staff) to the resident. The notification may advise the resident that a digital mail item has arrived, is ready for delivery, and/or may include instructions on how to access digital mailbox database 104, for example, using one or more of devices 108-112.

Electronic digital mail center 103 may also notify the resident that a digital mail item has arrived for him or her via communication system 106. In some implementations, when residents attempt to use one of devices 108-112 to initiate a call or remote visitation, communication system 106 and/or electronic digital mail center 103 may play an audio or video message or cue that a digital mail item is ready for delivery. The resident may then access his or her digital mailbox in database 104 and review its contents. For example, the resident may enter voice commands or DMFT tones via devices 109 or 110 in response to an audio menu presented by IVR 107. Additionally, or alternatively, communication system 106 and/or electronic digital mail center 103 may serve a web-based version (e.g., website, webpage, Internet or intranet portal, etc.) of the resident's digital mailbox to devices 108 or 110-112, for example.

In addition to storing digital versions of physical or electronic items in digital mailbox database 104, electronic digital mail center 103 may also enable enforcement of inbound mail restrictions imposed by facility 100 or other authorities. For example, facility 100 may have rules forbidding residents from receiving more than a given amount of correspondence each day, week, or month. In some cases, electronic digital mail center 103 may recognize a violation of the mail volume limitation and return the physical item to the sender. In other cases, however, upon converting a physical item to an electronic representation, electronic digital mail center 103 may store the electronic representation in database 104 and delay notifying the resident until it is determined that a mail volume restriction is not being violated. Examples of inbound mail restriction rules include, but are not limited to, a maximum number of letters, envelopes or packages, a maximum number of pages or items, a maximum size of an object, a maximum number of objects, a maximum size of the resulting electronic representation (e.g., in kilobytes or megabytes), etc. Each of these different types of restrictions may be associated with a respective time period.

Moreover, electronic digital mail center 103 may be configured to enforce security protocols implemented by facility 100 or other authorities, such as using investigative data aggregation and analysis system 117. For example, upon receiving a letter, electronic digital mail center 103 may perform an optical character recognition (OCR) operation followed by an automated examination of its contents (e.g., via keyword searching, word or text spotting, etc.). In some cases, electronic digital mail center 103 may also perform a range of biometric analyses including, but not limited to, handwriting recognition, facial recognition, graphic content recognition, etc. in a similar fashion. In this manner, rather than having the staff manually read all incoming letters, a computer-based algorithm may flag security violations in an automated way. For example, if the physical item is an image or a photograph, image recognition software may be used to flag pornographic or other forbidden materials. In some cases, image recognition routines may be applied to an image or photograph to ensure that a resident does not receive information about certain persons (e.g., crime victims or potential victims), places, objects, etc. Similar security protocols may be applied to inbound electronic documents 102.

In various implementations, in order to enforce mail restrictions and/or security protocols, electronic digital mail center 103 may obtain certain information from AMS 105. For example, if an inbound letter identifies a particular sender listed in AMS 105 as a gang member, the digital version of the letter may be flagged for review and not be delivered to the resident. In some cases, the information obtained by electronic digital mail center 103 may aid in criminal investigations in and out of facility 100. For example, police or other investigative authorities may request facility 100 to implement notification rules with respect to specific residents (or groups of residents) so that, if the resident receives a certain type of physical or electronic item (or an item sent by a particular person, etc.), investigative data aggregation and analysis system 106 may notify the authorities automatically.

In addition, these digitization techniques may allow investigative authorities to link different residents or identify behavioral patterns that would otherwise go unnoticed by the prison staff. For example, an investigator may be able to query digital mailbox database 104 to determine that a same nonresident is mailing physical letters to different residents. The investigator may also query database 104 to determine, for example, that various residents are receiving communications regarding the same or similar topics. As such, investigators may be empowered to monitor or otherwise intercept communications that may be related to criminal or gang-related activities and more.

After converting the physical or electronic item to its electronic representation and helping enforce mail restrictions and/or security protocols, electronic digital mail center 103 may determine how to handle the physical item. In some cases, the physical item may be sent to a storage facility. For example, the physical item may be tagged with a bar code, radio frequency identification (RFID) module, etc. prior to being sent to storage. The tag may include, for example, the date of receipt of the item, the date that the item was mailed, the type of item, the identity and/or address of the sender, the identity of the addressee (e.g., resident identification number, case number, etc.), or the like.

Electronic digital mail center 103 may then maintain an electronic database of stored physical or electronic items. In various implementations, each entry of such a database may be associated with a copy of the digital version of the corresponding physical or electronic item stored in database 104. In this manner, upon release from facility 100, the resident may retrieve the physical items from storage. Additionally, or alternatively, the physical items may be disposed of according to a retention policy implemented by facility 100. For example, a retention policy may mandate that paper items be shredded a number of days, months, or years after receipt, and that other objects be maintained in storage until the resident's release. In some cases, whether or not a particular physical item has been determined to violate a security protocol may govern its eventual disposition. For instance, in some cases, the physical or electronic item may be used as evidence in criminal proceedings.

In some embodiments, electronic digital mail center 103 may perform similar operations upon at least a portion of the outbound mail—i.e., physical or electronic items sent by a resident of facility 100 to a nonresident of that facility. For example, if a resident writes a letter to a family member whose e-mail address, phone number, or other contact information is known (e.g., stored in AMS 105, etc.), then electronic digital mail center 103 may convert the physical item to an electronic format (e.g., OCR, text-to-speech, etc.) and deliver the digital version of the item (e.g., by e-mail, telephone, FAX, etc.) rather than (or in addition to) delivering the item itself. In these cases, facility 100 may have outbound restrictions and/or security protocols that may be different from their inbound counterparts, but that nonetheless may be implemented by electronic digital mail center 103.

When converting an outbound physical letter or document to electronic form or when formatting an inbound electronic document 102 for storage, electronic digital mail center 103 may add one or more electronic or digital signatures to the resulting electronic representation of the document. In some embodiments, two distinct signatures or certificates may be added to the electronic representation. A first digital signature may be added on behalf of the resident to certify that the resident wrote or signed the document, and a second signature may be added certifying that the prison processed the original physical document. In this manner, the resident may be able to conduct certain types of business from within controlled-environment facility 100.

Although shown as located at controlled-environment facility 100, it will be understood that electronic digital mail center 103, communication system 106, and/or investigative data aggregation and analysis system 117 may be at a location that is remote from facility 100. Electronic digital mail center 103 may be located at least partially within controlled-environment facility 100. In other embodiments, however, electronic digital mail center 103 may be remotely located with respect to facility 100 and connected to communication system 106 via the Internet or other network. In some cases, a single electronic digital mail center 103 may serve two or more facilities 100. In other cases, a single facility 100 may be served by two or more electronic post offices 103. In some implementations, electronic digital mail center 103 may interact with one or more AMS 105 systems directly or via a computer network, such as the Internet. Alternatively, electronic digital mail center 103 may be incorporated into AMS 105 or vice-versa. Accordingly, in some cases, an RDP database may be combined with digital mailbox database 104 (and/or the database of stored physical or electronic items), and electronic digital mail center 103 and/or AMS 105 may enforce inbound/outbound mail restrictions and/or security protocols.

Nonresidents, including former residents, may remotely access documents in digital mailbox database 104. For example, a nonresident may use computer 115 to connect to digital mailbox database 104 via network 116. A digital mail portal 118 may be associated with a publicly accessible domain that the nonresident connects to using a web browser, for example. The digital mail portal 118 acts as an external gateway to digital mailbox database 104 and prompts the nonresident to enter the appropriate credentials in order to access digital mailbox database 104. Unless approved credentials are provided, the nonresident will be prevented from accessing digital mailbox database 104. Remote access credentials may be managed, for example, by AMS 105. Remote access to digital mailbox database 104 may be monitored by investigative data aggregation and analysis system 117, for example, to ensure only authorized users are allowed access and to monitor the types of items being accessed and/or to prevent access to restricted or unauthorized content.

In some embodiments, digital mail items may need to be provided directly to nonresidents. For example, where facility 100 is a prison or jail, digital mail items may be relevant to a legal proceeding, such as potential trial exhibits or in response to a subpoena or other legal document request. In such cases, printed hard copies or a CD with electronic copies of digital mail items may be provided to a nonresident, such as a resident's attorney, prosecutor's office, law enforcement agency, investigator, or the like. If such documents are later used at a trial, hearing, or administrative proceeding, there may be a need to prove that the document presented is an accurate and unaltered copy of the original physical document that was scanned by the electronic digital mail center 103.

In one embodiment, a unique identifier is assigned to every new digital mail item as it is created from received physical or electronic mail. A unique identifier may be created, for example, for each page of a letter or document, for each photograph, picture, or image, or for each email, chat, text, or other item that is received. The unique identifier may be used as the file name of the digital mail item and/or may be appended to the data comprising the digital mail item, such as by embedding the unique identifier as a header or as metadata in an electronic image file (e.g., the JPG, PDF, or other file format used for the digital mail items).

When the digital mail item is provided to a nonresident either as a printed document or as an electronic image file (i.e., as physical or electronic copy), the unique identifier is included with the electronic file and/or as a part of the image. In one embodiment, the unique identifier may be printed on the image as a matrix barcode or two-dimensional barcode, such as a Quick Response (QR) code. Alternatively, the unique identifier may be printed as alphanumeric text, as a linear or one-dimensional barcode, or using any other appropriate format. When a QR code is used, a URL, such as website address, may be embedded in the code. The nonresident or other party may then scan the code using a QR reader application, which typically uses a camera to read the QR code and then launches a web browser directed to the embedded URL. The URL may be associated with digital mail portal 118, for example, and may further include a document-specific identifier. Accordingly, when a nonresident at computer 115 reads a QR code on a document provided by facility 100, a web browser on computer 115 will be directed to digital mail portal 118, which may then prompt the user to provide credentials to access digital mailbox database 104. If the user provides the required credentials, then an image of the digital mail item is provided for display on computer 115. This image can be compared to the physical or electronic copy received by the nonresident to ensure that the physical or electronic copy has not been altered and is a complete copy.

Figure 2:
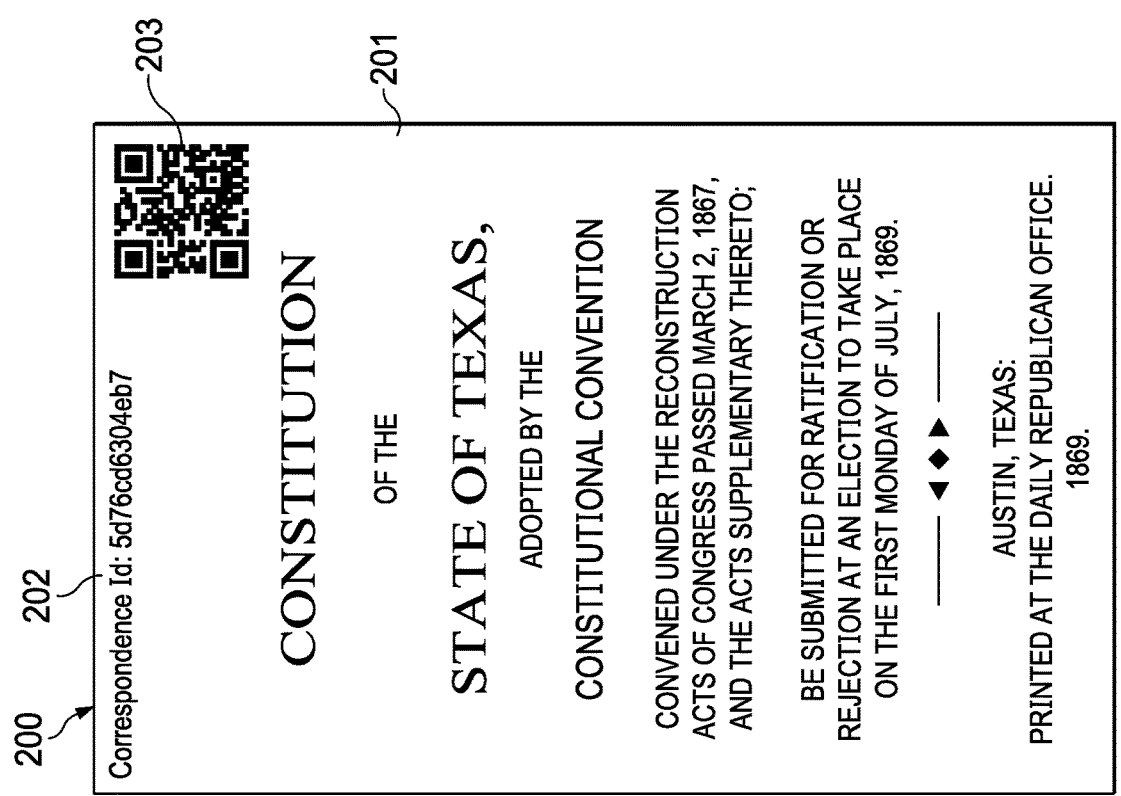
FIG. 2 illustrates a digital mail document that is created by scanning a physical document.

FIG. 2 illustrates a digital mail document 200 that is created by scanning a physical document, such as a letter, legal document, birthday card, etc., for example, that was received via postal mail. Digital mail document 200 comprises an image 201 of the original physical document that was received for a resident of facility 100. The original physical document is scanned by electronic digital mail center 103 to create image 201. A unique identifier is associated with the original physical document and with the scanned image 201. The unique identifier may be a correspondence identifier 202, for example, that is used as the file name for digital mail document 200. A QR code 203 is created for the digital mail document 200. The data in the QR code 203 may include the URL for digital mail portal 118 and the unique identifier for the original physical document. Digital mail document 200 may be saved to digital mailbox database 104.

Figure 3:
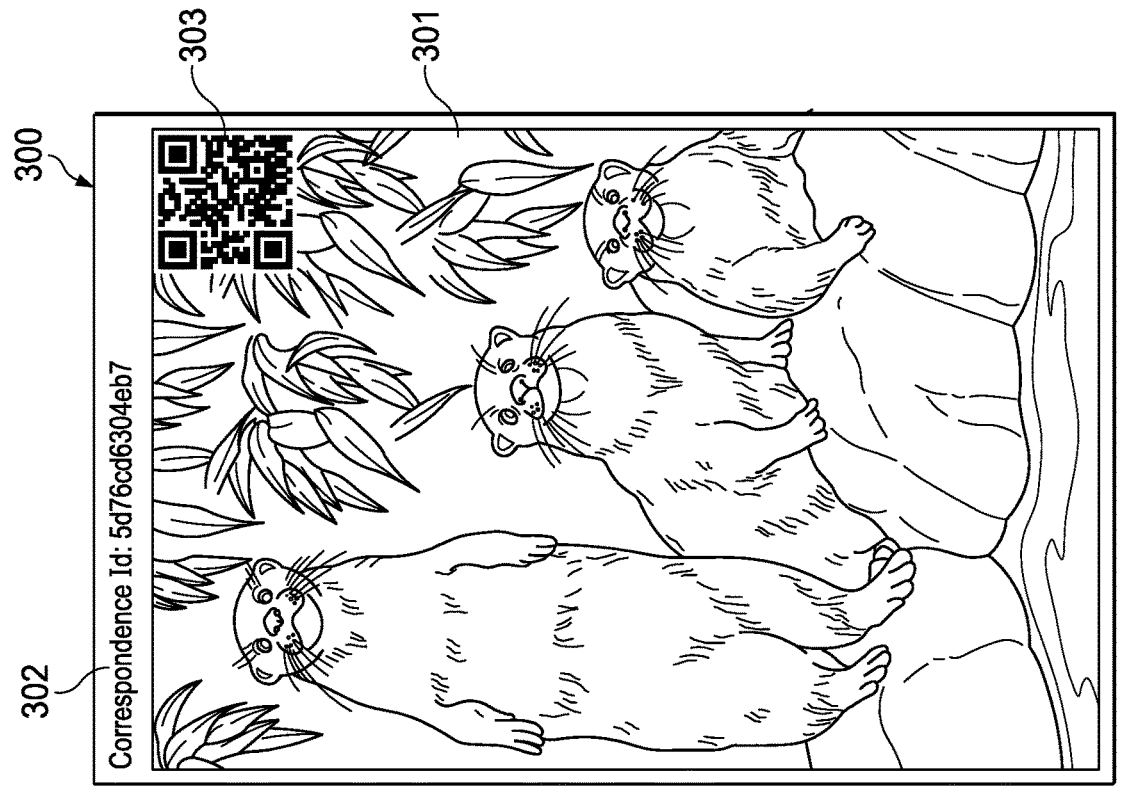
FIG. 3 illustrates a digital mail image that is created by scanning a physical image.

FIG. 3 illustrates a digital mail image 300 that is created by scanning a physical image, such as a picture, drawing, photograph, etc., for example, that was received via postal mail. Digital mail image 300 comprises an image 301 of the original physical image that was received for a resident of facility 100. The original physical image is scanned by electronic digital mail center 103 to create image 301. A unique identifier is associated with the original physical image and with the scanned image 301. The unique identifier may be a correspondence identifier 302, for example, that is used as the file name for digital mail image 300. A QR code 303 is created for the digital mail image 300 and includes the URL for digital mail portal 118 and the unique identifier for the original physical image. Digital mail image 300 may be saved to digital mailbox database 104.

A resident may access digital mail document 200 and/or digital mail image 300 using one of devices 108 or 110-112. When a resident accesses digital mail document 200 or digital mail image 300, the image 201 or 301 alone may be displayed without QR code 203 or 303 in some embodiments. In other embodiments, QR code 203 or 303 may become a permanent element of digital mail document 200 or digital mail image 300, respectively, and is always displayed with image 201 or 301. When digital mail document 200 or digital mail image 300 are produced to a nonresident, the QR code 203 or 303 is always included to provide the nonresident with a link to digital mailbox database 104, which allows the nonresident to verify that the document or image copy is unaltered and complete.

Although the examples of FIGS. 2 and 3 show a unique identifier 202, 303 on the document, it will be understood that the unique identifier may or may not be included on the document in all cases. For example, the unique identifier may be included on printed copies or electronic copies provided to nonresidents, but not shown when displayed to residents on devices 108 or 110-112.

Moreover, the QR code 203 or 303 on digital mail document 200 or digital mail image 300 is shown in the upper right corner of the document 200 or image 300, it will be understood that the QR code 203 or 303 may be placed anywhere on the document or image. The QR code placement may be standardized for all documents and images in database 104 or for all of the documents or images in a particular production to a nonresident. Alternatively, the placement of QR code 203 or 303 may vary by document or image so that the QR code is placed in whitespace on a document (e.g., in a margin, header, or footer) or apart from significant features in an image (e.g., in a margin, overlapping a background feature, overlapping an unfocused feature, or overlapping an area of consistent content, such as a region of blue sky, a wall, etc.). The size and orientation of the QR code may also be adjusted based upon each particular digital mail document or digital mail image to minimize covering content of interest.

Figure 4:
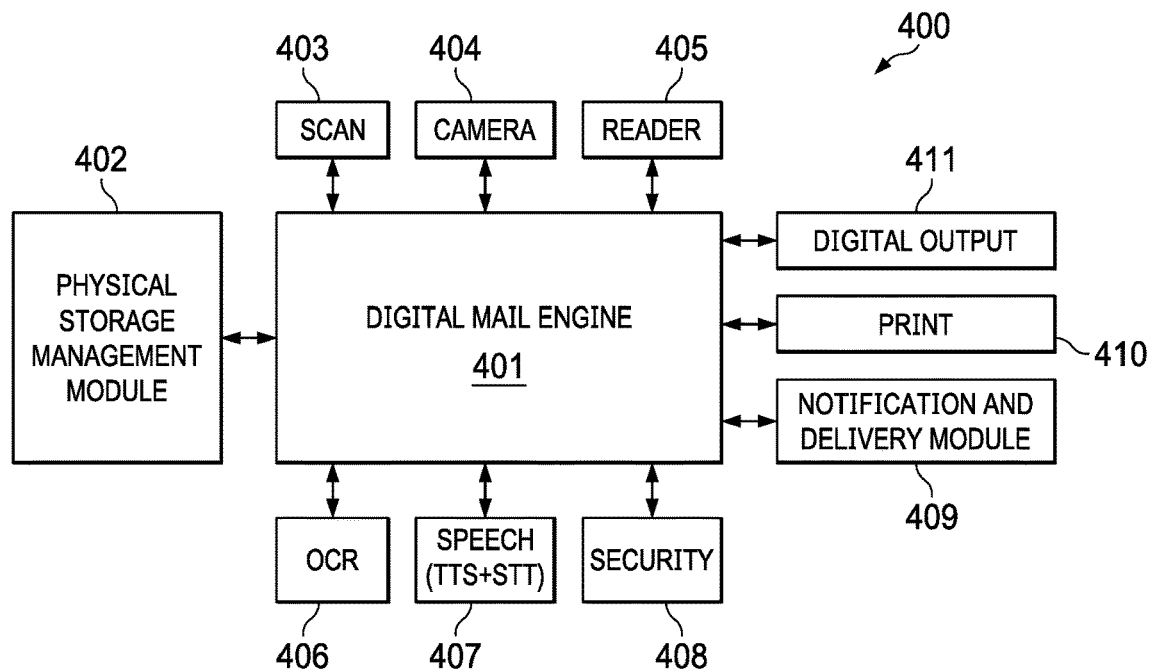
FIG. 4 is a block diagram of a digital mailbox system according to some embodiments.

FIG. 4 is a block diagram of a digital mailbox system 400. In various embodiments, such a digital mailbox system 400 may be implemented, at least in part, by electronic digital mail center 103. Digital mail engine 401 is coupled to physical storage management module 402, scanning module 403, camera module 404, reader module 405, OCR module 406, speech module 407, security module 408, notification and delivery module 409, printing module 410, and digital output module 411.

As illustrated, digital mail engine 401 may manage the process of converting a physical or electronic item, such as a document or image, to a corresponding electronic representation and storing that representation in digital mailbox database 104 of FIG. 1. Digital mail engine 401 may also manage the receipt, conversion/reformatting, and storage of inbound electronic documents 102. Physical storage management module 402 may be configured to manage the digitization of physical mail items and to store the digital version of mail items. Management module 402 may create a unique identifier and QR code for each document or image. Scanning module 403 may be configured to operate an optical scanner and process paper items, for example, where the paper item includes writings in visible or invisible ink. Camera 404 may be configured to create a digital image of a physical item (e.g., a three-dimensional object), and reader 405 may be configured to operate an optical disc drive, flash memory reader, etc.

OCR module 406 may be configured to perform an OCR or handwriting recognition operation upon an image (such as image 201) obtained via scanning module 403, camera module 404, and/or reader 405 to covert that image to searchable text. In addition to recognizing text, OCR module 406 may also recognize the language used, and automatically translate the resulting text into a different language (e.g., Spanish to English, etc.). In some cases, OCR module 406, scanning module 403, and printer 410 may be configured to translate Braille to another spoken language and vice-versa. Speech module 407 may be configured to perform text-to-speech (TTS) and/or speech-to-text (STT) operations upon certain types of digital representations of a physical or electronic item.

Physical storage management module 402 may be configured to maintain a database of physical items stored in a particular location or warehouse, inside or outside of facility 100. Module 402 may also be used to generate instructions as to which items need to be retrieved from storage prior to a resident's release, as well as to enforce the facility's item retention policies. Security module 408 may be configured to implement inbound/outbound mail restrictions and/or security protocols. For example, security module 408 may be configured to perform keyword searches upon a digital representation of a physical or electronic item (e.g., an OCR'd version of a letter, a text version of an audio file, etc.) and to flag offensive content. Notification and delivery module 409 may be configured to notify residents and/or staff within facility 100 that an item has arrived, and to deliver the digital version of the item upon the resident or staff's request. For instance, the electronic representation may be delivered to one or more of devices 108-112 shown in FIG. 1. In various embodiments, modules 401-411 shown in FIG. 4 may represent sets of software routines, logic functions, and/or data structures that are configured to perform operations described herein.

Printing module 410 may operate a printer, for example, to produce paper notifications to residents and/or prison staff and to create copies of digital mail items for nonresidents. When printing module 410 prints a copy of a scanned document or image, it includes the QR code for that document on the printed copy.

Digital output module 411 may be, for example, an application configured to save electronic files to disk using a CD burner or to a thumb drive using a USB port. When digital output module 411 saves a scanned document or image, it includes the QR code for that document on the saved copy.

Although modules 401-411 are shown as distinct logical blocks, in other embodiments at least some of the functionality provided by these modules may be combined into fewer blocks. Conversely, one or more of modules 401-411 may be implemented such that it is divided among two or more logical blocks. Moreover, although shown with a particular configuration, in other embodiments these various modules may be rearranged in other ways.

Figure 5:
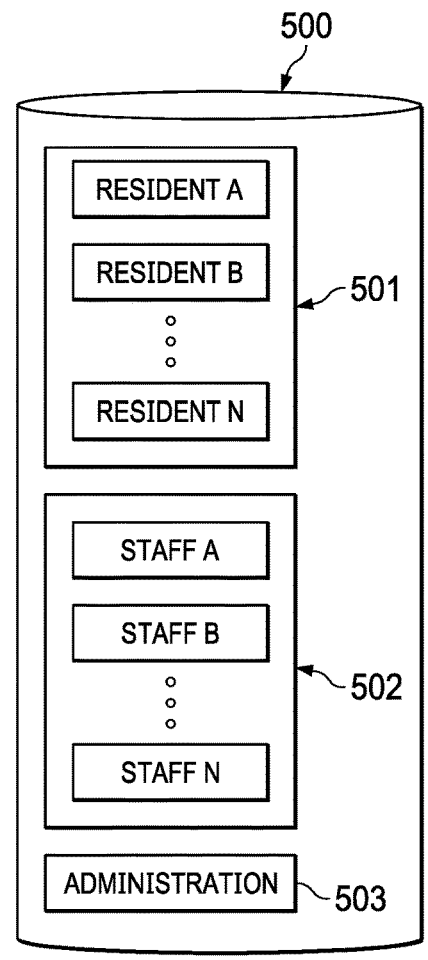
FIG. 5 is a diagram of a digital mailbox database according to some embodiments

FIG. 5 is a diagram of a digital mailbox database 500 according to some embodiments. In various implementations, digital mailbox database 500 may be created and maintained by digital mail engine 401 of electronic digital mail center 103. As illustrated, database 500 may include resident records 501, staff records 502, and/or administration records 503. Each of these records may represent digital version of physical or electronic items received for a specific resident, staff, or administration personnel, respectively. A digital mailbox for each individual resident may include, for each electronic record, fields comprising, for example, a unique identifier, a QR code, an identification of the sender (e.g., by name, social security number, driver's license number, etc.), a physical address or P.O. box, a date when the item was mailed, a type of delivery (e.g., USPS, UPS, Federal Express, in-person, etc.), date/time of delivery, a type/size of envelope or package, a description of the item (e.g., letter, legal document, etc.), a number of pages or items, a language in which the document is in, etc. The record may also include or otherwise be linked to the electronic documents (e.g., image, audio, video, text, etc.). Additional fields in each record may include text extracted from the document or letter, a speech-to-text results, etc.

In some cases, the size of the digital mailbox allocated to each individual resident may be limited as per the prison's mail restrictions, and the resident may be allowed to purchase extra space, for example, using funds from his or her trust account, calling account, etc. For instance, prior to reaching the maximum storage limit for his or her digital mailbox, the resident may be notified of that and may be given the option to purchase additional space and/or delete some of the previously received electronic documents.

Generally speaking, database 500 may include any suitable type of application or data structure that may be configured as a persistent data repository. For example, database 500 may be configured as a relational database that includes one or more tables of columns and rows and that may be searched or queried according to a query language, such SQL or the like. Alternatively, database 104 may be configured as a structured data store that includes records formatted according to a markup language, such as XML, or the like. In other embodiments, database 104 may be implemented using one or more arbitrarily or minimally structured files managed and accessible through a corresponding type of application.

Figure 6:
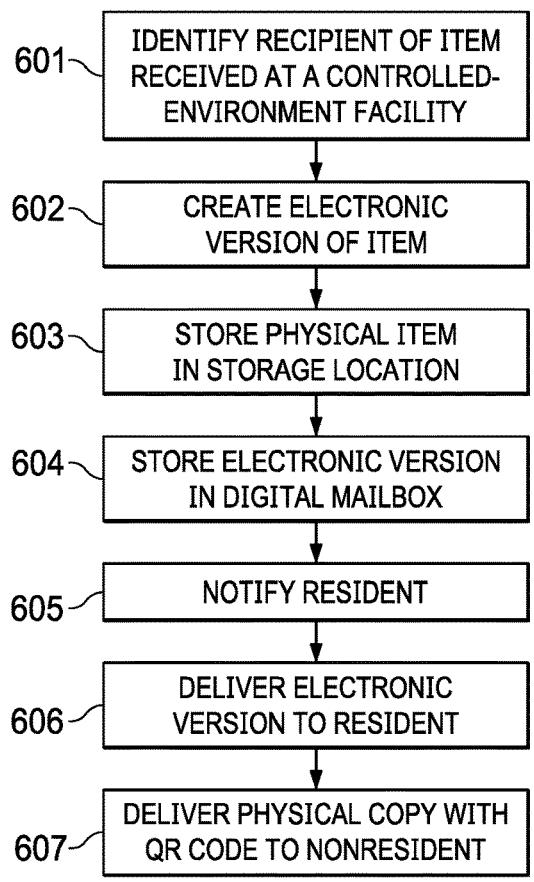
FIG. 6 is a flowchart of a method for digitizing physical or electronic items arriving at a controlled-environment facility.

FIG. 6 is a flowchart of a method for digitization of physical or electronic items arriving at a controlled-environment facility according to some embodiments. This method may be performed, for example, by electronic digital mail center 103 of FIG. 1. At block 601, electronic digital mail center 103 receives an inbound physical or electronic item and identifies the intended recipient of the item, for example, by scanning an envelope, package, or label addressing that recipient. At block 602, electronic digital mail center 103 may create an electronic version or digital representation of the physical or electronic item or may reformat an inbound electronic document as described above, to generate a digital mail document 200 or digital mail image 300, for example. At block 603, electronic digital mail center 103 may cause the physical item to be stored in a storage location associated or designated by controlled-environment facility 100. At block 604, electronic digital mail center 103 may store the electronic representation (e.g., digital mail document 200 or digital mail image 300) in a digital mailbox (e.g., in database 104) associated with the receiving resident. Then, at block 605, electronic digital mail center 103 may notify the resident that an item has arrived, for example, via communication system 106. At block 606 electronic digital mail center 103 may deliver the electronic representation of the item (e.g., digital mail document 200 or digital mail image 300) to the resident via communication system 106.

Figure 7:
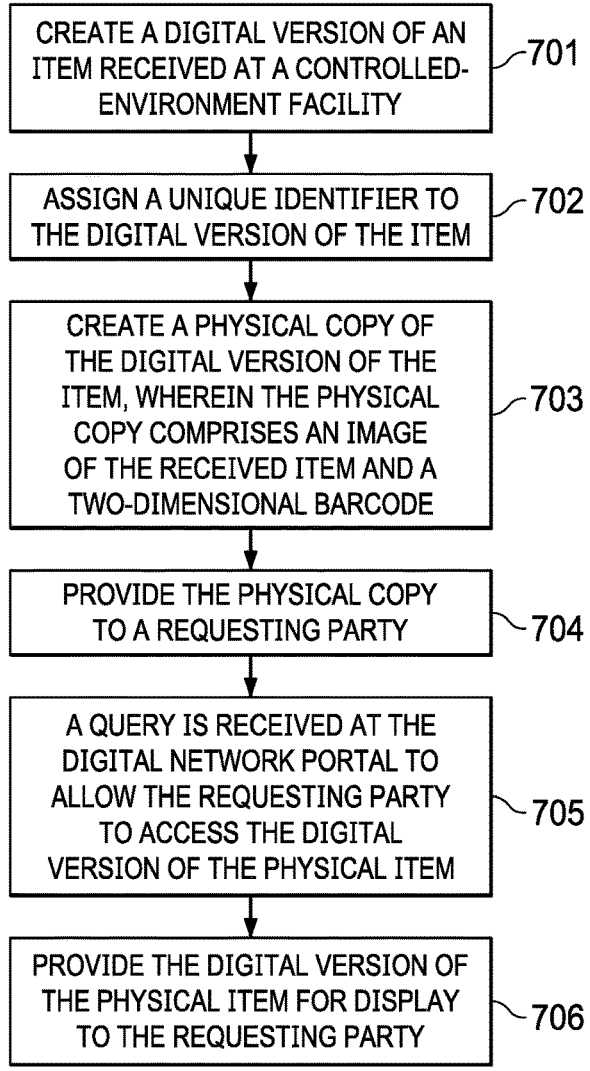
FIG. 7 is a flowchart of a method for providing digitized versions of physical or electronic items to requesting parties.

FIG. 7 is a flowchart of a method for providing digitized versions of physical or electronic items to requesting parties according to some embodiments. In step 701, a digital version of a physical or electronic item is created. The physical item (e.g. a letter) or electronic item (e.g. an email) has been received at a controlled-environment facility. The controlled-environment facility may be a prison or jail, wherein the physical or electronic item has been sent to an inmate, arrestee, or detainee who is a resident of the facility. The physical copy may be a printed hard copy of the digital version if, for example, the physical item is a document or letter. The physical copy may be a digital media device configured to store a copy of the digital version if, for example, the physical item is a memory device. The physical copy may be a digital representation of an object if, for example, the physical item is a three-dimensional object.

In step 702, a unique identifier is assigned to the digital version of the received physical or electronic item. In step 703, a physical or electronic copy of the digital version of the item is created. The physical or electronic copy comprises an image of the physical or electronic item and a two-dimensional barcode. The two-dimensional barcode comprises a network address for a digital network portal and a unique identifier. The digital network portal may be a server hosting a website that is configured to be accessed from a public data network. The two-dimensional barcode may comprise a QR code. For example, a physical copy may comprise a hard copy printout of the digital version of the original physical or electronic item received at the controlled-environment facility. An electronic copy may comprise a USB flash drive (e.g. a thumb drive) or CD or DVD disk with the digital version loaded thereon.

In step 704, the physical or electronic copy is provided to a requesting party, wherein the requesting party is not a resident of the controlled-environment facility. In step 705, a query is received at the digital network portal from the requesting party. The query requests access to the digital version of the received physical or electronic item. The query comprises the unique identifier. In step 706, the digital version of the physical or electronic item is provided for display to the requesting party.

Figure 8:
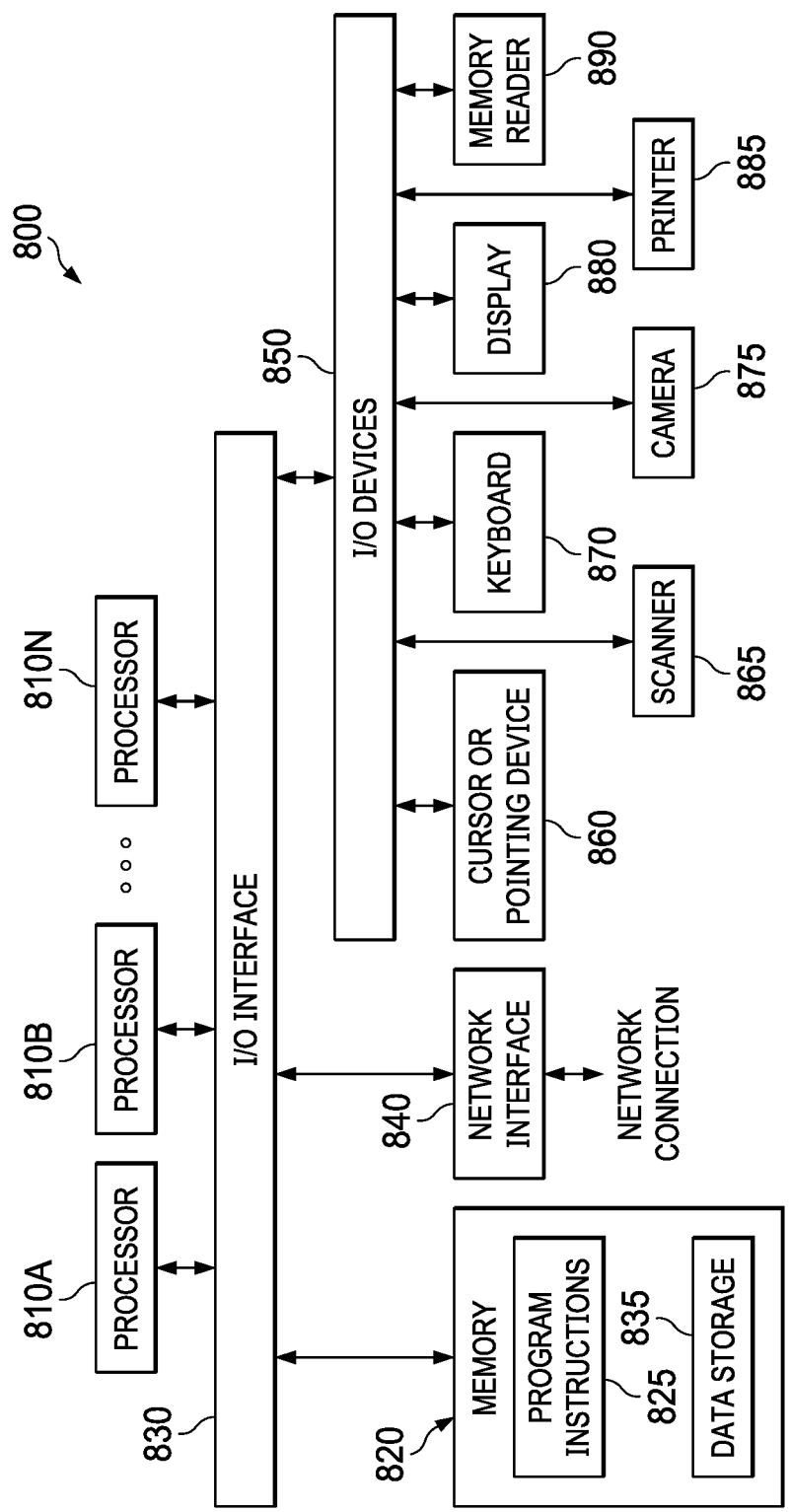
FIG. 8 is a block diagram of a computer system capable of performing operations according to various embodiments.

Embodiments of systems and methods for providing and maintaining digital mailboxes for residents of controlled environment facilities, as described herein, may be implemented or executed by one or more computer systems. One such computer system is illustrated in FIG. 8. In various embodiments, computer system 800 may be a server, a mainframe computer system, a workstation, a network computer, a desktop computer, a laptop, or the like. For example, in some cases, electronic digital mail center 103 shown in FIG. 1 may be implemented as computer system 800. Moreover, one or more of communication system 106, IVR 107, AMS system 105, and/or devices 108-112 may include one or more computers in the form of computer system 800. As explained above, in different embodiments these various computer systems may be configured to communicate with each other in any suitable way, such as, for example, via a local area network (LAN), a wide area network (WAN), or the Internet.

As illustrated, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, scanner 865, keyboard 870, camera 875, display(s) 880, printer 885, and memory reader 890. In some embodiments, a given entity (e.g., electronic digital mail center 103) may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements (e.g., a first computer system may implement digital mail engine 401 while another computer system may implement physical storage management module 402 of electronic digital mail center 103).

In various embodiments, computer system 800 may be a single-processor system including one processor 810, or a multi-processor system including two or more processors 810 (e.g., two, four, eight, or another suitable number). Each of processors 810 may be any processor capable of executing program instructions. For example, in various embodiments, processors 810 may be general-purpose or embedded processors implementing any of a variety of instruction set architectures (ISAs), such as the x88, PowerPC®, ARM®, SPARC®, or MIPS® ISAs, or any other suitable ISA. In multi-processor systems, each of processors 810 may commonly, but not necessarily, implement the same ISA. Also, in some embodiments, at least one processor 810 may be a graphics processing unit (GPU) or other dedicated graphics-rendering device.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 1-7, may be stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-readable storage medium may include any tangible storage media or memory media such as magnetic or optical media—e.g., disk or CD/DVD-ROM coupled to computer system 800 via I/O interface 830, for example, via memory reader 890 (e.g., an optical disc drive, a Flash reader, etc.). Program instructions and data stored on a tangible computer-readable storage medium in non-transitory form may then further be transmitted by transmission media or signals such as electrical, electromagnetic, or digital signals, which may be conveyed via a communication medium such as a network and/or a wireless link, such as may be implemented via network interface 840.

In an embodiment, I/O interface 830 may be configured to coordinate I/O traffic between processor 810, system memory 820, and any peripheral devices, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, printers, cameras, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement certain embodiments described herein, and data storage 835, comprising various data accessible by program instructions 825. In an embodiment, program instructions 825 may include software elements of embodiments illustrated in the above figures. For example, program instructions 825 may be implemented in various embodiments using any desired programming language, scripting language, or combination of programming languages and/or scripting languages (e.g., C, C++, C#, Java™, JavaScript™, Perl, etc.). Data storage 835 may include data that may be used in these embodiments. For example, in some cases data storage 835 may include digital mailbox database 104. In other embodiments, other or different software elements and/or data may be included.

A person of ordinary skill in the art will appreciate that computer system 800 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various systems and methods illustrated in the figures and described herein represent example embodiments of systems and methods for providing and maintaining digital mailboxes for residents of controlled environment facilities. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A system, comprising:
a database configured to store digital versions of original physical or electronic items received at a controlled-environment facility, each of the digital versions assigned with a unique identifier and comprising a digital signature certifying that the controlled-environment facility processed the original physical or electronic item;
a security module configured to implement restrictions and security protocols on the digital versions, wherein each of the digital version that contains restricted content is flagged in the database;
a digital network portal configured to provide remote access to the database; and
a production system configured to create physical or electronic copies of selected ones of the stored digital versions, the physical or electronic copy comprising an image of the physical or electronic item, a two-dimensional barcode, and the digital signature certifying that the controlled-environment facility processed the original physical or electronic item, and wherein the two-dimensional barcode comprises a network address for the digital network portal and the unique identifier.

2. The system of claim 1, wherein the production system comprises:
a printer configured to print hard copies of the selected ones of the stored digital versions.

3. The system of claim 1, wherein the production system comprises:
a digital output module configured to save copies of the selected ones of the stored digital versions to digital media.

4. The system of claim 1, wherein the digital network portal is a server hosting a website that is configured to be accessed from a public data network.

5. The system of claim 1, wherein the physical item comprises a document, letter, or photograph and wherein the digital version of the physical item is created by scanning the physical item.

6. The system of claim 1, wherein the physical item comprises a memory device, and wherein the digital version of the physical item comprises copying content stored on the memory device.

7. The system of claim 1, wherein the physical item comprises a three-dimensional object, and wherein the digital version of the physical item includes creating a digital representation of the three-dimensional object.

8. The system of claim 1, wherein the controlled-environment facility is a prison or jail, and wherein the physical or electronic item has been sent to an inmate, arrestee, or detainee who is a resident of the facility.

9. The system of claim 1, wherein the two-dimensional barcode comprises a Quick Response (QR) code and/or the digital signature certifying that the controlled-environment facility processed the original physical or electronic item.

10. A method, comprising:
creating a digital version of an original physical or electronic item received at a controlled-environment facility;
assigning a unique identifier to the digital version of the original physical or electronic item;
creating a physical or electronic copy of the digital version of the original physical or electronic item, wherein the physical or electronic copy comprises an image of the original physical or electronic item, a two-dimensional barcode, and a digital signature certifying that the controlled-environment facility processed the original physical or electronic item, and wherein the two-dimensional barcode comprises a network address for a digital network portal and the unique identifier;
providing the physical or electronic copy to a requesting party;
receiving, at the digital network portal, a query from the requesting party to access the digital version of the original physical or electronic item, wherein the query comprises the unique identifier; and
providing the digital version of the original physical or electronic item for display to the requesting party.

11. The method of claim 10, wherein the physical or electronic copy of the digital version of the original physical or electronic item is a printed hard copy of the digital version.

12. The method of claim 10, wherein the physical or electronic copy of the digital version of the original physical or electronic item is a digital media device configured to store a copy of the digital version.

13. The method of claim 10, wherein the digital network portal is a server hosting a website that is configured to be accessed from a public data network.

14. The method of claim 10, wherein the physical item comprises a document, letter, or photograph, and wherein the digital version of the physical item is created by scanning the physical item.

15. The method of claim 10, wherein the physical item comprises a memory device, and wherein the digital version of the physical item comprises copying content stored on the memory device.

16. The method of claim 10, wherein the physical item comprises a three-dimensional object, and wherein the digital version of the physical item comprises creating a digital representation of the three-dimensional object.

17. The method of claim 10, wherein the controlled-environment facility is a prison or jail, and wherein the original physical or electronic item has been sent to an inmate, arrestee, or detainee who is a resident of the facility.

18. The method of claim 10, wherein the two-dimensional barcode comprises a Quick Response (QR) code and/or the digital signature certifying that the controlled-environment facility processed the original physical or electronic item.

19. The method of claim 10, wherein the requesting party is not a resident of the controlled-environment facility.

20. The method of claim 10, wherein the physical or electronic copy further comprises a second digital signature certifying the original physical or electronic item was written or signed by a specific resident.

* * * * *